(12) United States Patent
Yin

(10) Patent No.: US 6,692,389 B2
(45) Date of Patent: Feb. 17, 2004

(54) AUTOMATIC DERAILLEUR

(76) Inventor: Hwa-Yung Yin, 9F-7, No. 3, Sec 2 Mei Chwan E. Rd., W. Dist., Taichung (TW)

( * ) Notice: Subject to any disclaimer, the term of this patent is extended or adjusted under 35 U.S.C. 154(b) by 73 days.

(21) Appl. No.: 10/154,216

(22) Filed: May 22, 2002

(65) Prior Publication Data

US 2003/0220163 A1 Nov. 27, 2003

(51) Int. Cl.[7] ............................................. F16H 61/30
(52) U.S. Cl. ........................... 474/80; 474/82; 474/70; 280/236
(58) Field of Search ............................. 474/70, 80–82, 474/78, 69; 280/236, 259, 260, 238, 261, 216

(56) References Cited

U.S. PATENT DOCUMENTS

| | | | | |
|---|---|---|---|---|
| 4,352,503 A | * | 10/1982 | Cotter | 280/238 |
| 4,503,951 A | * | 3/1985 | Imaizumi | 188/280 |
| 4,938,324 A | * | 7/1990 | Van Dyke | 188/317 |
| 5,605,514 A | * | 2/1997 | Driver | 474/70 |
| 5,655,982 A | * | 8/1997 | Fyfe | 474/80 |
| 5,890,979 A | * | 4/1999 | Wendler | 474/82 |
| 6,325,733 B1 | * | 12/2001 | Patterson et al. | 474/80 |

FOREIGN PATENT DOCUMENTS

DE          19518960 A1 * 11/1996 ............ B62M/9/14

* cited by examiner

*Primary Examiner*—Marcus Charles
(74) *Attorney, Agent, or Firm*—Pro-Techtor International Services

(57) ABSTRACT

An automatic derailleur device comprises an arm, a sprocket roller meshed with one of a set of different-sized sprocket wheels on, a control member, a tension wheel meshed with a sprocket chain and secured to the arm, a cylinder including a shaft secured to the arm, an intermediate collar on the shaft, an elastic member on the shaft and biased between the collar and the cylinder, and a hollow cylindrical block with the shaft passed through, and a pump in the cylinder and including a piston rod rotatably coupled to the sprocket roller, a plurality of blades extended from the piston rod, and a cylindrical passage formed between the cylinder and the block. The sprocket chain is shiftable from a meshing with a largest sprocket wheel to a smallest sprocket wheel automatically as the bicycle is accelerating from a stop or low speed to a high speed and vice versa.

3 Claims, 6 Drawing Sheets

AUTOMATIC DERAILLEUR

FIELD OF THE INVENTION

The present invention relates to derailleur and more particularly to an automatic derailleur which is adapted to speed change so as to more effectively save labor of a rider.

BACKGROUND OF THE INVENTION

A bicycle equipped with derailleur is well known. However, such conventional bicycle suffered from several disadvantages. For example, a rider cannot manually operate a gear selector in time when a road condition has changed. For example, a flat road has changed into an uphill road. As such, the rider has to spend more labor in riding. Moreover, for most riders they cannot suitably operate the gear selector due to lack of experience and/or complicated operating procedure. There are some available bicycles are equipped with automatic derailleurs. However, they are relatively expensive and the derailleur is comprised of too many components, thus bulky. Additionally, there are still some available bicycles equipped electronic automatic derailleurs. However, as known that rain may rust the bicycle as well as the electronic automatic derailleur since there is no or little protection of the derailleur. As a result, it is susceptible to being malfunctioned. Thus improvement exists.

SUMMARY OF THE INVENTION

It is therefore an object of the present invention to provide an automatic derailleur device adapted to a speed change of a bicycle comprising derailleur means mounted to a frame adjacent a hub of a rear wheel and comprising an arm, a sprocket roller meshed with one of a set of different-sized sprocket wheels on the rear wheel; control means comprising a control member and a lower tension wheel meshed with an endless sprocket chain wherein the tension wheel is coupled to the control member and secured to one end of the arm by a fastener respectively and the control member is coupled to both a control cable and the frame; a hydraulic cylinder comprising a shaft having a large outer cylindrical section secured to the other end of the arm and a small inner cylindrical section, a collar at a junction of the outer and the inner cylindrical sections, an elastic member put on the large outer cylindrical section and biased between the collar and an inner wall of the hydraulic cylinder, and a hollow cylindrical block with the small inner cylindrical section passed through; and a pump enclosed by the hydraulic cylinder and comprising a piston rod extended through the hydraulic cylinder to rotatably couple to the sprocket roller, a plurality of blades radially extended from the piston rod and abutted on the other opposite inner wall of the hydraulic cylinder, and a cylindrical passage formed between a portion of an inner surface of the hydraulic cylinder and the hollow cylindrical block, the passage served to communicate oil between the hydraulic cylinder and the pump. Whereby in a stop or low speed of the bicycle, a largest one of the set of sprocket wheels is meshed between the sprocket chain and the sprocket roller, the elastic member is expanded to bias the collar inward to urge against the hollow cylindrical block by its stored energized force, the small inner cylindrical section of the shaft is actuated to move to compress an oil stored in the pump to flow to the hydraulic cylinder through the passage, and the other end of the arm is proximate an outer surface of the hydraulic cylinder. Alternatively in an acceleration of the bicycle, the oil in the hydraulic cylinder is sucked to flow to the pump through the passage by a rotation of the blades which is in synchronism with the rotating sprocket roller, the small inner cylindrical section of the shaft is forced to move outward by the oil in the pump, the elastic member is compressed outward by the collar, the large outer cylindrical section of the shaft is actuated to extend outward from the hydraulic cylinder, the other end of the arm moves away from the outer surface of the hydraulic cylinder, and a smaller one of the set of sprocket wheels is meshed with the sprocket chain and the largest one of the set of sprocket wheels is meshed with the sprocket roller respectively.

The above and other objects, features and advantages of the present invention will become apparent from the following detailed description taken with the accompanying drawings.

DETAILED DESCRIPTION OF THE PREFERRED EMBODIMENTS

Figure 1:
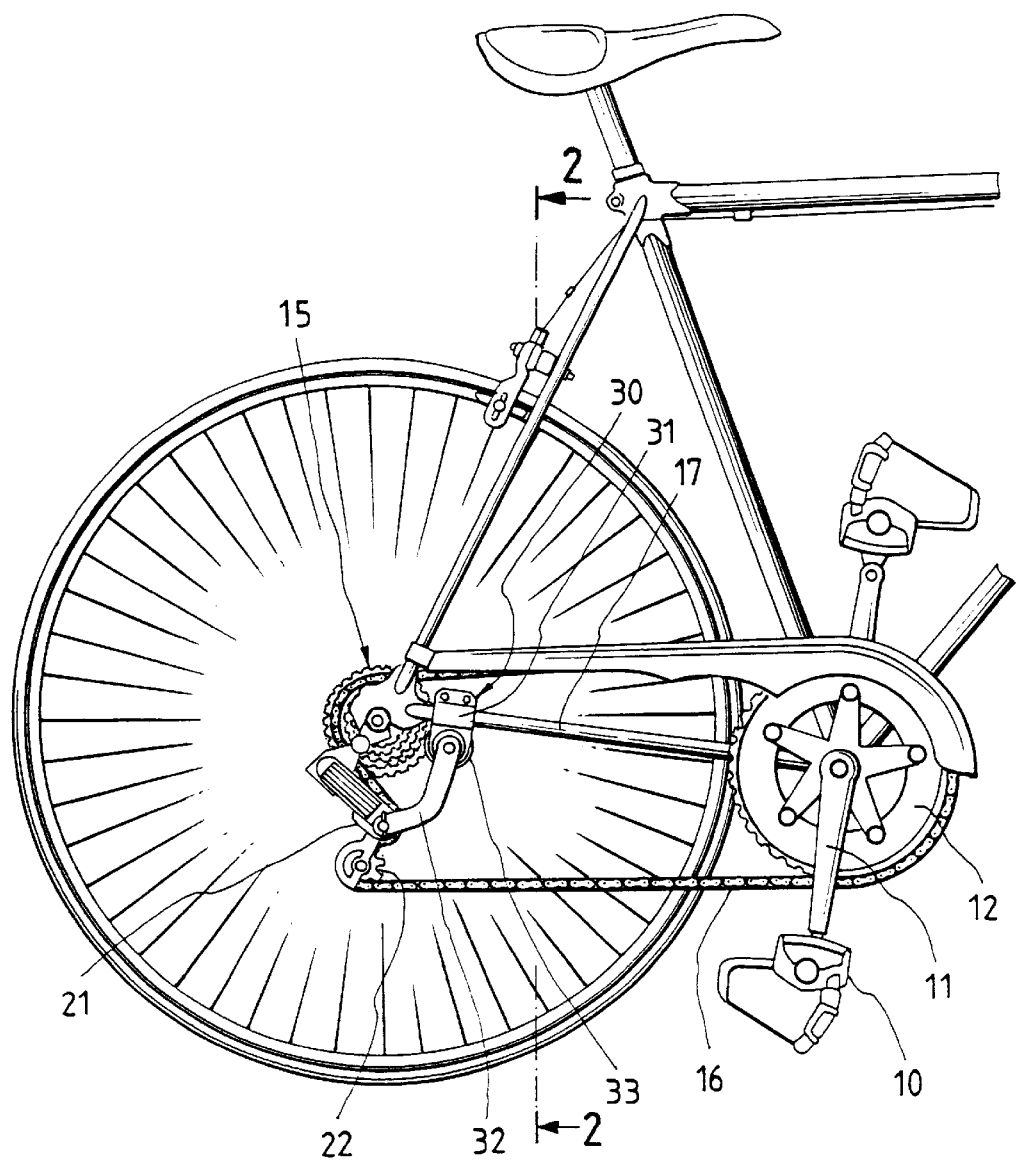
FIG. 1 is a side view of a rear portion of a bicycle equipped with a preferred embodiment of automatic derailleur according to the invention.
Figure 2:
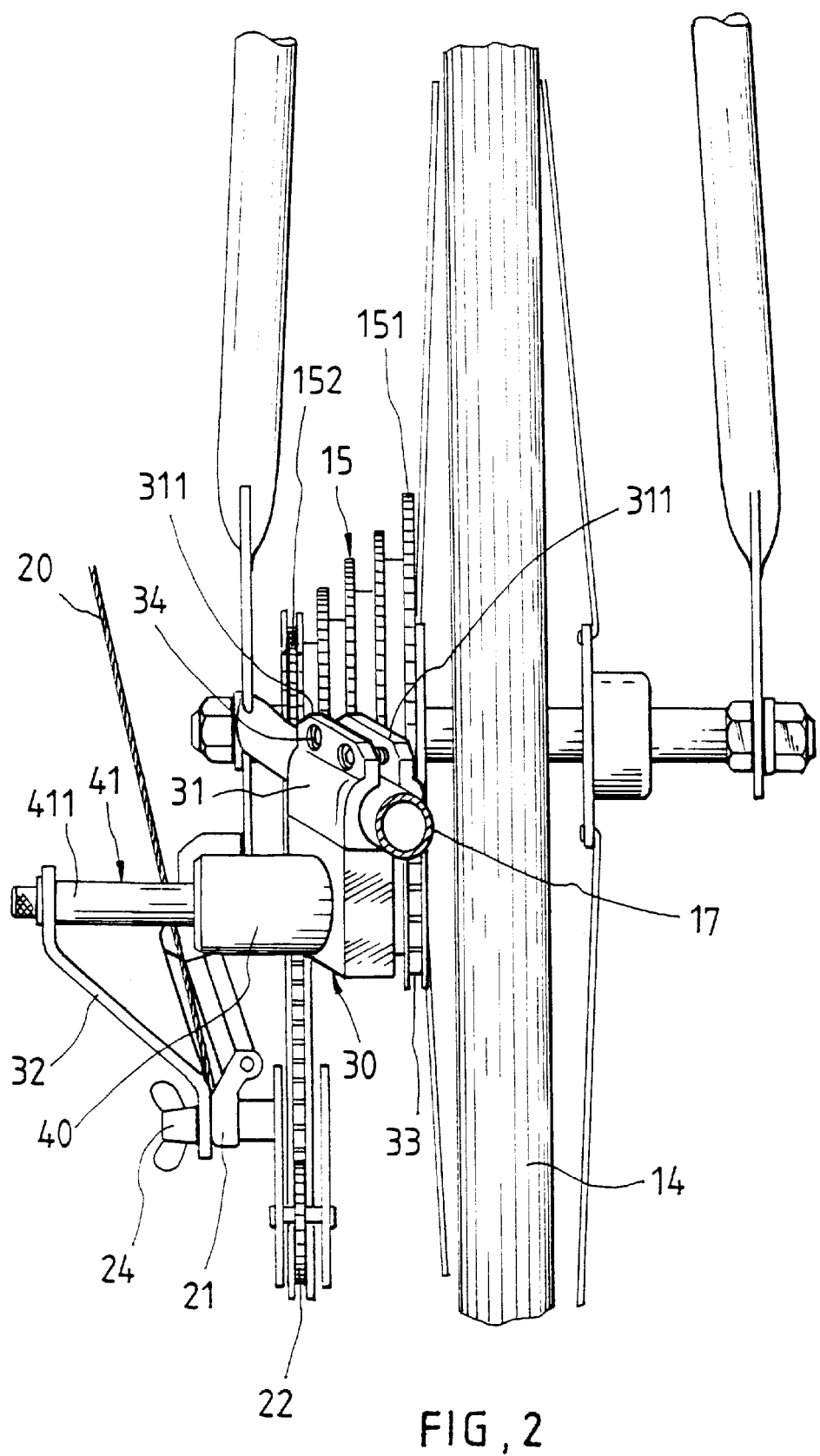
FIG. 2 is a cross-sectional view taken along line 2—2 of FIG. 1.

Referring to FIGS. 1 to 4, a construction of an automatic derailleur 30 in accordance with the invention is illustrated. As conventional, pedals 10 are coupled to bottom bracket axles on centers of chain wheels 12 by means of cranks 11. Wheels may move forward by a connection of an endless sprocket chain 16 as a rider rotates the pedals 10 by foot. In one conventional manual operation, the rider may operate a gear selector (not shown) to change a speed of the bicycle via a control cable 20 if such is desired. However, as stated in the background section, such gear selection is disadvantageous. Thus, the invention is directed to provide the automatic derailleur 30 which is mounted adjacent a hub of a rear wheel.

The derailleur 30 comprises a substantially U-shaped upper clamp member 31 having two vertical sections 311 and two threaded holes 34 at each vertical section 311. Hence, a chain stay 17 of frame passed through a bottom elongate groove of the clamp member 31 may be secured thereto by driving fasteners (e.g., bolt and nut combinations) through the holes 34. The derailleur 30 further comprise an arm 32 coupled between a shaft 41 of a hydraulic cylinder 40 and a control member 21. The control member 21 is secured to a lower tension wheel 22 by a wing nut 24. The tension wheel 22 is meshed with the sprocket chain 16. The control member 21 is in turn coupled to one end of the control cable 20. The derailleur 30 further comprises a sprocket roller 33 meshed with a largest one of a set of different-sized sprocket wheels 15 on the rear wheel (i.e., a largest sprocket wheel 151 in this embodiment).

The hydraulic cylinder 40 is a container device formed at an outer side of the derailleur 30. The shaft 41 comprises a large outer cylindrical section 411 secured to the arm 32 and a small inner cylindrical section 412. Within the hydraulic cylinder 40 there are further provided a collar 42 at a junction of the outer and the inner cylindrical sections 411 and 412, an elastic member (e.g., helical spring) 43 put on the large outer cylindrical section 411 and biased between the collar 42 and an inner wall of the hydraulic cylinder 40, and a hollow cylindrical block 44 with the small inner cylindrical section 412 passed through. The pump 50 is enclosed in the hydraulic cylinder 40 and comprises a piston rod 52 extended through the hydraulic cylinder 40 to rotatably couple to the sprocket roller 33, a plurality of blades 51 radially extended from the piston rod 52 and abutted on the other opposite inner wall of the hydraulic cylinder 40, and a cylindrical passage 53 formed between a portion of an inner surface of the hydraulic cylinder 40 and the hollow cylindrical block 44. The passage 53 serves to communicate oil between the hydraulic cylinder 40 and the pump 50.

Figure 3:
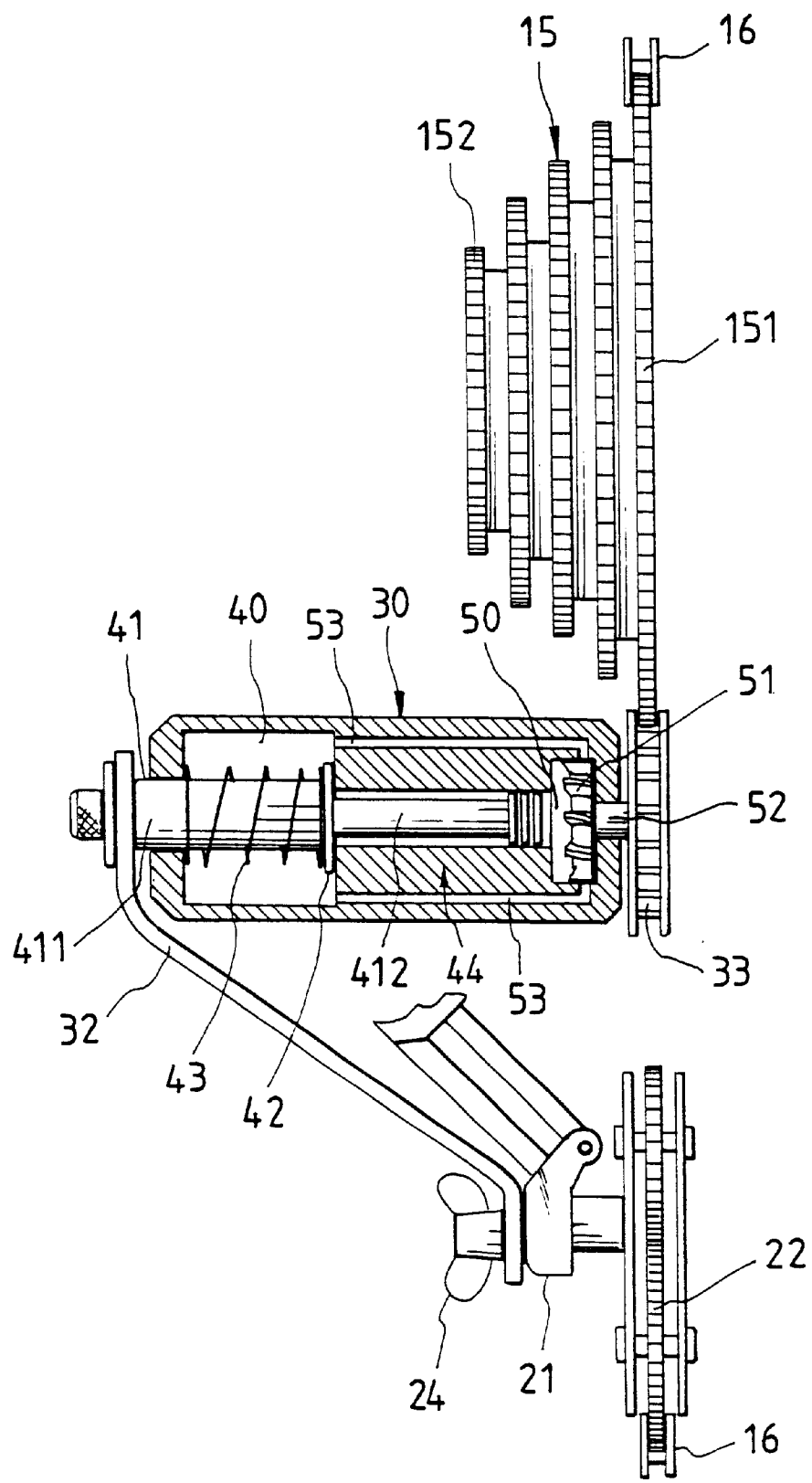
FIG. 3 is a cross-sectional view of the automatic derailleur, a set of different-sized sprocket wheels, a tension wheel, and a control member of FIG. 2 where the bicycle is either moving in a low speed or stopped.
Figure 4:
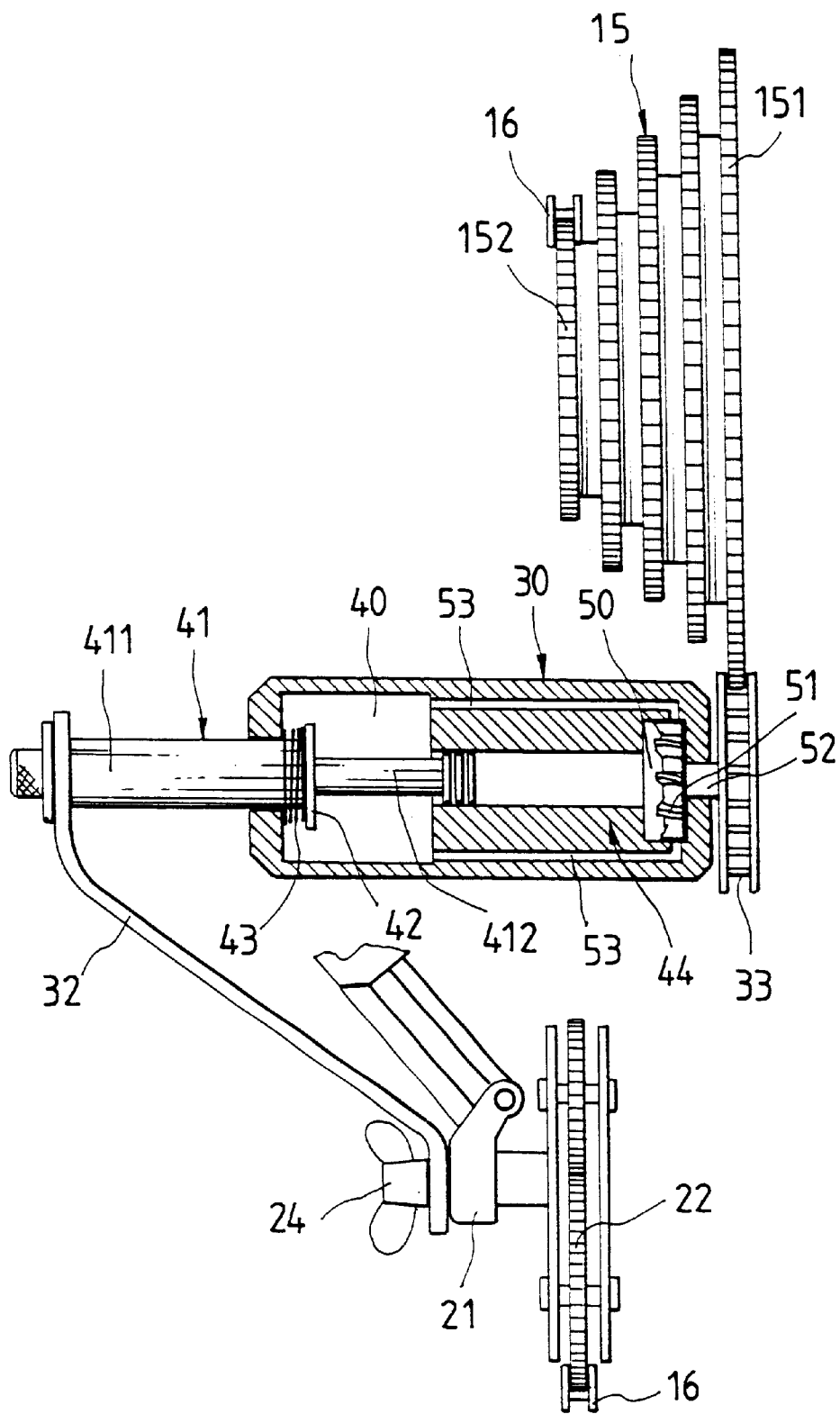
FIG. 4 is a view similar to FIG. 3 where the bicycle is moving in a high speed.

Referring to FIGS. 3 and 4 specifically, an operation of the derailleur 30 will now be described below. Positions of components of the derailleur 30 and other associate members in an initial state (i.e., stop or low speed of the bicycle such as on an uphill road) are shown in FIG. 3. As seen, the largest sprocket wheel 151 is meshed between the sprocket chain 16 and the sprocket roller 33. The elastic member 43 is expanded to bias the collar 42 inward to urge against the hollow cylindrical block 44 by its stored energized force. In response, the small inner cylindrical section 412 of the shaft 41 is actuated to move to compress oil stored in a reservoir of the pump 50. As a result, the oil stored in the reservoir of the pump 50 is forced to flow to a reservoir of the hydraulic cylinder 40 through the passage 53. At the same time, one end of the arm 32 is proximate the outer surface of the hydraulic cylinder 40.

Positions of components of the derailleur 30 and other associate members in the initial state shown in FIG. 3 are automatically changed to that of FIG. 4 as the bicycle is accelerating on a flat road or on a downhill road. The oil stored in the reservoir of the hydraulic cylinder 40 is sucked to flow to the reservoir of the pump 50 through the passage 53 by a rotation of the blades 51 which is in synchronism with the rotating sprocket roller 33. In response, the small inner cylindrical section 412 of the shaft 41 is forced to move outward by the oil in the pump 50. Thereafter, the elastic member 43 is compressed outward by the collar 42. Thus, the large outer cylindrical section 411 of the shaft 41 is actuated to extend outward from the hydraulic cylinder 40. As a result, one end of the arm 32 moves away from the outer surface of the hydraulic cylinder 40. In an allowable maximum speed of the bicycle, a smallest sprocket wheel 152 is meshed with the sprocket chain 16 and the largest sprocket wheel 151 is meshed with the sprocket roller 33 respectively at this time. In brief, the sprocket chain 16 is permitted to shift from a meshing with the largest sprocket wheel 151 to a meshing with the smallest sprocket wheel 152 automatically as the bicycle is accelerating from a stop (or low speed) to a high speed and vice versa.

Figure 5:
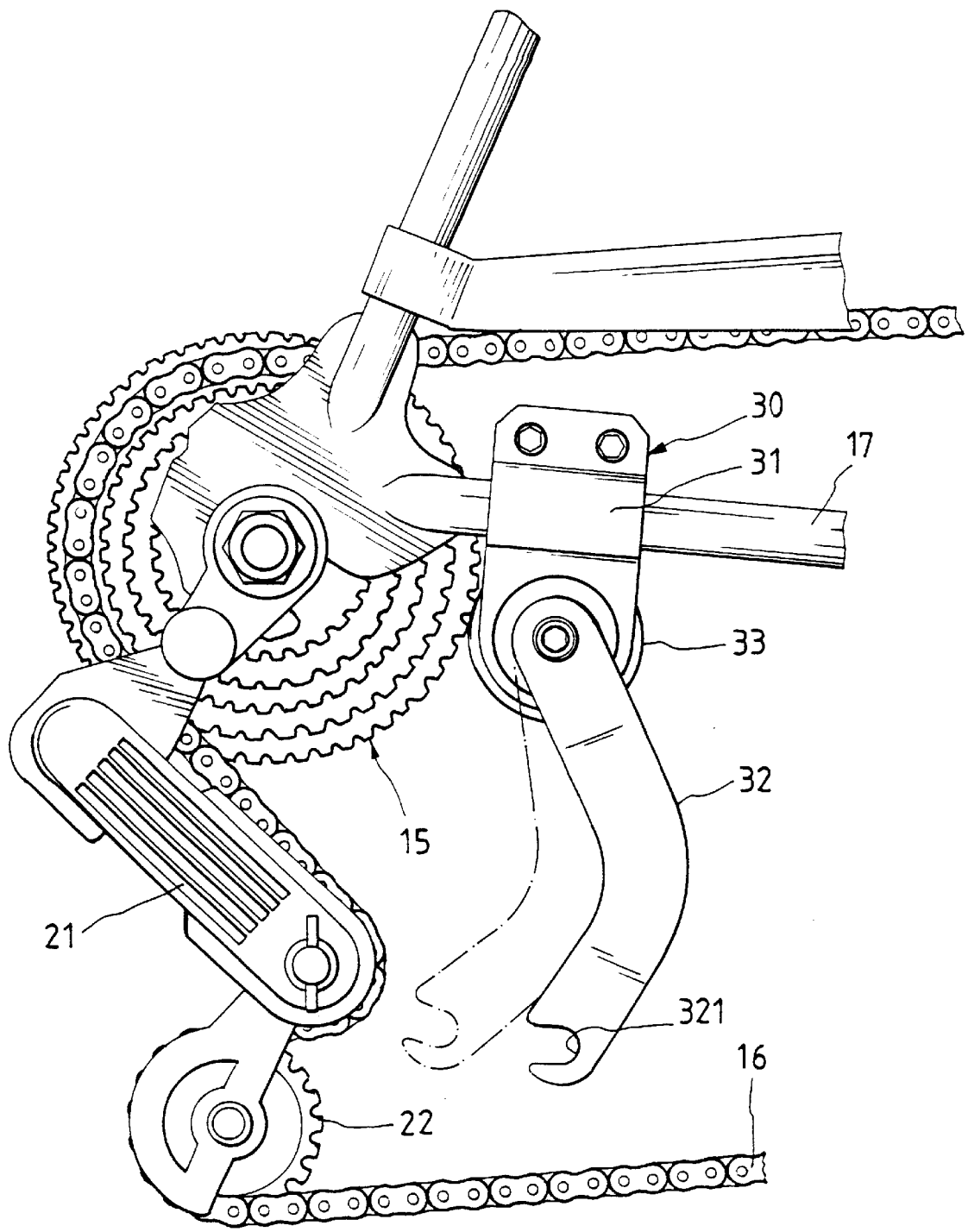
FIG. 5 is partial enlarged view of a portion near hub of rear wheel of the bicycle of FIG. 1.
Figure 6:
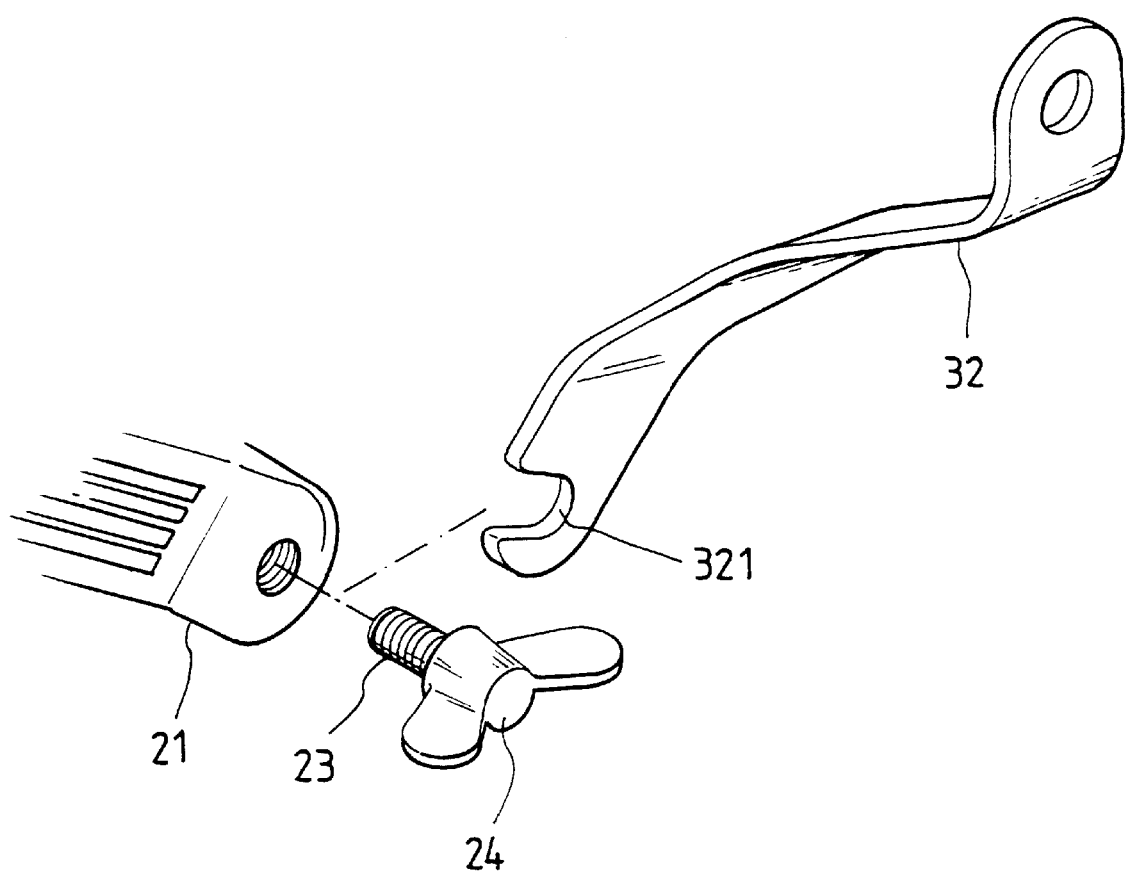
FIG. 6 is an exploded view of the arm and the wing nut securable to the control member.

Referring to FIGS. 5 and 6, there is a recess 321 formed at one end of the arm 32. As such a threaded shank 23 of the wing nut 24 may be driven through the recess 321 to secure to the control member 21. The rider may quickly disengage the arm 32 from the control member 21 by unfastening the wing nut 24 if the conventional manual speed selection is desired.

While the invention has been described by means of specific embodiments, numerous modifications and variations could be made thereto by those skilled in the art without departing from the scope and spirit of the invention set forth in the claims.

What is claimed is:

1. An automatic derailleur device for a bicycle comprising:

derailleur means mounted to a frame adjacent a hub of a rear wheel and comprising an arm, a sprocket roller meshed with one of a set of different-sized sprocket wheels on the rear wheel;

control means comprising a control member and a lower tension wheel meshed with an endless sprocket chain wherein the tension wheel is coupled to the control member and secured to one end of the arm by a fastener respectively and the control member is coupled to both a control cable and the frame;

a hydraulic cylinder comprising a shaft having a large outer cylindrical section secured to the other end of the arm and a small inner cylindrical section, a collar at a junction of the outer and the inner cylindrical sections, an elastic member put on the large outer cylindrical section and biased between the collar and an inner wall of the hydraulic cylinder, and a hollow cylindrical block with the small inner cylindrical section passed through; and a pump enclosed by the hydraulic cylinder and comprising a piston rod extended through the hydraulic cylinder to rotatably couple to the sprocket roller, a plurality of blades radially extended from the piston rod and abutted on the other opposite inner wall of the hydraulic cylinder, and a cylindrical passage formed between a portion of an inner surface of the hydraulic cylinder and the hollow cylindrical block, the passage served to communicate oil between the hydraulic cylinder and the pump;

whereby in a stop or low speed of the bicycle, a largest one of the set of sprocket wheels is meshed between the sprocket chain and the sprocket roller, the elastic member is expanded to bias the collar inward to urge against the hollow cylindrical block by its stored energized force, the small inner cylindrical section of the shaft is actuated to move to compress an oil stored in the pump to flow to the hydraulic cylinder through the passage, and the other end of the arm is proximate an outer surface of the hydraulic cylinder; or in an acceleration of the bicycle, the oil in the hydraulic cylinder is sucked to flow to the pump through the passage by a rotation of the blades which is in synchronism with the rotating sprocket roller, the small inner cylindrical section of the shaft is forced to move outward by the oil in the pump, the elastic member is compressed outward by the collar, the large outer cylindrical section of the shaft is actuated to extend outward from the hydraulic cylinder, the other end of the arm moves away from the outer surface of the hydraulic cylinder, and a smaller one of the set of sprocket wheels is meshed with the sprocket chain and the largest one of the set of sprocket wheels is meshed with the sprocket roller respectively.

2. The automatic derailleur device of claim 1, wherein the elastic member is a helical spring.

3. The automatic derailleur device of claim 1, wherein the fastener is a wing nut.

* * * * *